United States Patent

Ajar

[15] 3,650,610
[45] Mar. 21, 1972

[54] MOTION PICTURE PROJECTOR SOUNDTRACK MOVEMENT

[72] Inventor: Charles Ajar, 4265 Clybourn, N. Hollywood, Calif. 91602

[22] Filed: Apr. 13, 1970

[21] Appl. No.: 27,606

[52] U.S. Cl. ................................. 352/31, 226/188, 352/187
[51] Int. Cl. ......................................................... G03b 31/04
[58] Field of Search .............................. 352/31, 27, 187, 190

[56] References Cited

UNITED STATES PATENTS 3,389,843  6/1968  Touchman ......................... 352/187 X
3,362,771  1/1968  Rodda ................................... 352/31 X
1,891,738  12/1932  Thomas ................................... 352/31

FOREIGN PATENTS OR APPLICATIONS 602,198  7/1960  Canada ................................... 352/31

Primary Examiner—Louis R. Prince
Assistant Examiner—Joseph W. Roskos
Attorney—Nilsson, Robbins, Wills, & Berliner

[57] ABSTRACT

A movement for continuously conducting a soundtrack between continuously rotatable sprocket wheels on opposite sides of a sound transducer, in which the sprockets are mechanically connected to pulleys grooved for and driven by timing belts.

7 Claims, 4 Drawing Figures

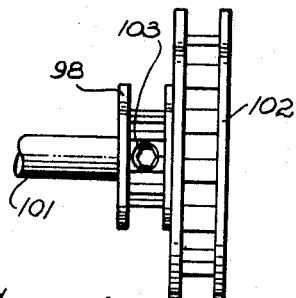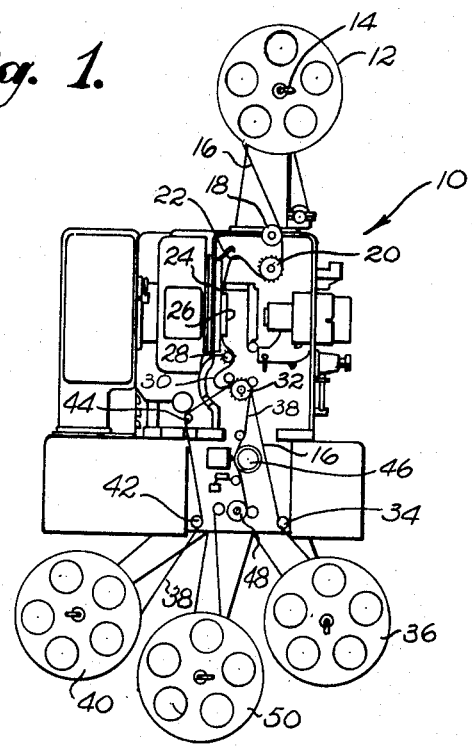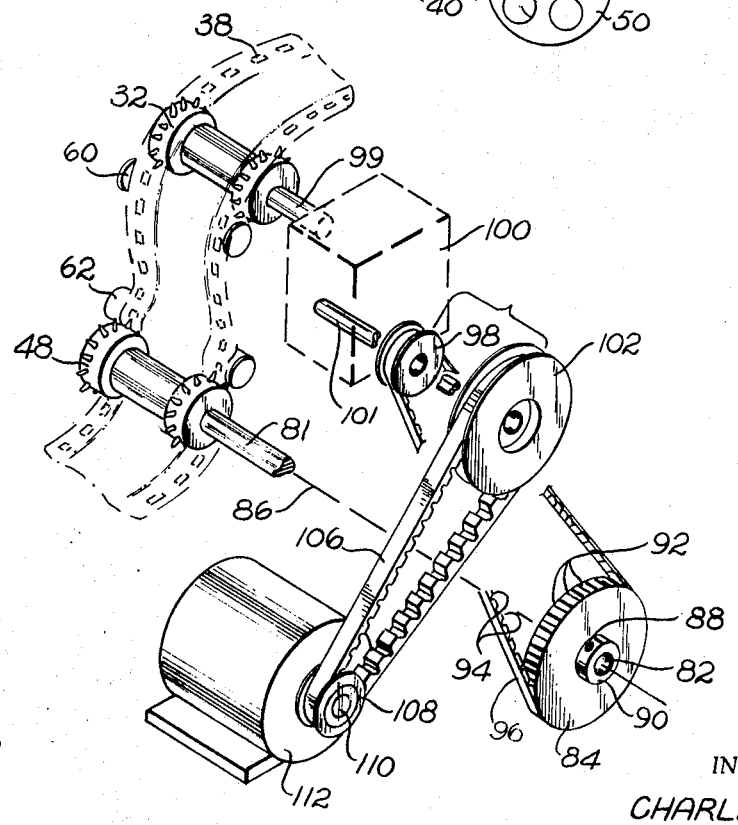

INVENTOR.
CHARLES AJAR 3,650,610

MOTION PICTURE PROJECTOR SOUNDTRACK MOVEMENT

FIELD OF THE INVENTION

The field of art to which the invention pertains includes the field of motion picture apparatus.

BACKGROUND AND SUMMARY OF THE INVENTION

In a typical motion picture sound projector, particularly for 35 mm. film, a reel of film is mounted on a spindle located on top of the machine. The film travels downwardly into the projector around an upper, continuously rotating sprocket. The film is then looped to form a loose bight for slack after which it travels down between a film trap and gate and is fitted about an intermittent or "pull down" sprocket wheel which is rotated by a Geneva mechanism to intermittently move the film past the film gate. The film is again looped and passed over another continuously rotatable middle sprocket wheel and then travels either into the sound transducer region or onto a takeup reel. With films on which the soundtrack is on the picture film, the film is led past the sound transducer and then onto a lower continuously rotating sprocket wheel and from there onto the takeup reel. When the soundtrack is disposed on a separate film strip, the picture film is led directly to a takeup reel. The soundtrack is then fed from a separate feel onto the middle sprocket wheel, beneath the picture film. From there, the soundtrack film travels past the sound transducer and onto the lower sprocket wheel, and from there onto a separate takeup reel.

In both of the above mechanisms, it is important that the continuously rotating sprocket wheels which bracket the sound transducer be rotating in unison and that they impart identical linear velocity to the film. If the bottom sprocket rotates at a slower speed than the top sprocket, the soundtrack will eventually loose registration with the sound transducer. If the bottom sprocket is faster than the top sprocket, ruptures in the film may occur. Previous mechanisms have attempted to insure close tracking between the bottom and top soundtrack sprockets by gear-coupling the sprockets. These mechanisms are generally very expensive and utilize a plurality of gears which are very carefully machined to very fine tolerances. Even such finely machined gears operate by the interengagement of metallic surface with resultant clashing noise with the result that such 35 mm. projectors have to be sound-isolated from the audience. Further, with extensive use, the gearing surfaces wear down so that eventually a differential in sprocket speed develops, necessitating high repair costs in replacement parts and time required for repair.

The present invention provides a mechanism for the continuous movement of motion picture film soundtrack which drastically decreases the number of metal gear surfaces required for operation yet which is accurate and durable. The mechanism of the present invention is very simple and inexpensive in construction and, when repair is required, parts can be rapidly and readily replaced. Further, the mechanism of this invention operates with much lower noise generation than conventional projectors.

In particular, the present invention relates to the continuously rotatable sprocket wheels which bracket the projector sound transducer. In accordance herewith, pulleys which are grooved for a timing belt are mechanically connected to the sprocket wheels and are interconnected by one or more motor driven timing belts. In specific embodiments, a driver pulley is operatively connected to the motor and communicates by timing belt with a first driven pulley which is operatively connected to one of the sprocket wheels. Another driver pulley is integrally connected (as by one-piece construction) with this first driven pulley and connects by timing belt to a second driven pulley which is operatively associated with the other sprocket wheel. By such means, rotation of the motor effects simultaneous and identical rotation of the sprocket wheels. Both sprocket wheels may be directly connected to their respective grooved pulleys, but in another particular embodiment, the uppermost driven pulley is connected to its sprocket wheel via gearing, which gearing is operatively associated with the Geneva movement so that the motor which continuously rotates the soundtrack sprocket wheels intermittently rotates the pull down sprocket.

BRIEF DESCRIPTION OF THE DRAWINGS

FIG. 1 is a side elevational view of a projector incorporating a mechanism of the present invention;

FIG. 3 is a perspective, partially schematic view of the sound transducer sprockets and rotation mechanism therefor; and FIG. 4 is a side elevational view of a pulley configuration utilized in this invention.

DETAILED DESCRIPTION

Figure 2:
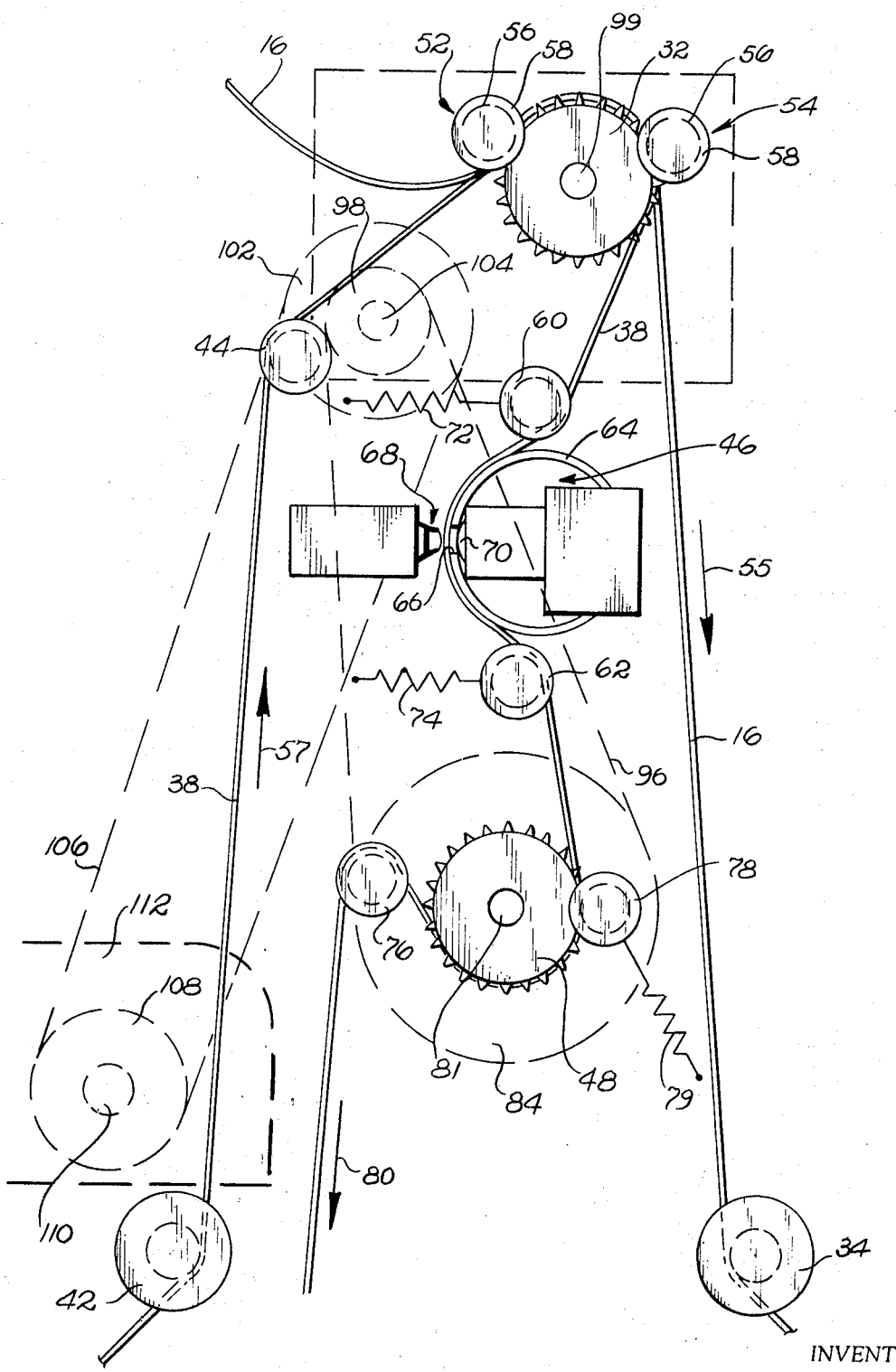
FIG. 2 is an enlarged, partially schematic view of the sound transducer area of the projector of FIG. 1.

Referring to FIG. 1, a motion picture projector 10 is shown which incorporates a soundtrack sprocket movement of this invention (various components have been omitted which are not directly relevant hereto). The projector 10 generally includes an upper film reel 12 mounted on a spindle 14 in the usual manner. The film 16 passes down past an upper roller 18 and then under a continuously rotatable sprocket wheel 20, after which a loop 22 is formed in the film and the film passes between a film trap 24 and gate 26 across a projection light beam to an intermittent, pull down sprocket 28 located below the film gate 26. A second loop 30 is then formed in the film 16 and the film 16 is passed over another continuously rotatable sprocket 32 and from there passes over an idler roller 34 and onto the film takeup reel 36.

In this particular illustration, the film 16 is not equipped with a soundtrack, but rather the soundtrack is located on a separate film strip 38. The soundtrack film strip 38 is contained on a separate reel 40, below the projector, and is fed into the projector over idler wheels 42 and 44 onto the above-noted continuously rotatable sprocket wheel 32, so as to be disposed beneath the film 16. The soundtrack film 38 is then fed past the sound transducer 46 and onto a lower continuously rotatable sprocket wheel 48, and from there onto a soundtrack film takeup reel 50, all of which will be considered in more detail hereinafter.

Although in the present illustration, the soundtrack is on a film 38 separate from the film 16, the present invention is equally applicable to the utilization of a single movie film in which the soundtrack is applied adjacent the picture area. In such a case, the picture film itself is led down into the sound transducer area, into operative association with the sound transducer 46, onto the lower continuously rotatable sprocket wheel 48, and from there onto its takeup reel.

Referring to FIG. 2, the components constituting the sound transducer 46 and bracketing sprocket wheels 32 and 48 are shown, partially in schematic form. Also shown in FIG. 2 in schematic form and by dashed lines are the pulley and belt components utilized to drive the sprocket wheels 34 and 48, and these components are shown more clearly in FIG. 3. As shown in more detail, and as indicated by the arrow 55, the film 16 is fed around the upper continuously rotatable sprocket wheel 32, guided thereon by guide members 52 and 54, and from there past the idler wheel 34 and onto the takeup reel 36 (not shown in FIG. 2). The guide members 52 and 54, and the other guide members which will be hereinafter referred to, each include an idler roller 56, shown in dashed lines, and an annular outer flange 58 to retain the film and maintain alignment thereof.

The film 38 is fed from the feed reel 40 (not shown in FIG. 2) past the idler rollers 42 and 44, as indicated by the arrow 57, onto the upper continuously rotatable wheel 32 beneath the film 16, and from there downwardly into the sound transducer area.

The sound transducer area includes a pair of guide members 60 and 62 on opposite vertical sides of the sound transducer 46. The term "sound transducer" is being utilized in a broad sense to designate any device across which the soundtrack film 38 is conducted for purposes of generating a sound signal from the soundtrack. Where appropriate, this surface may constitute the pickup head of a magnetic sound transducer, or may constitute the supporting surface of an optical sound transducer; or it may constitute a device which is convertible from one form of transducer to the other. In this particular embodiment, the sound transducer 46 is illustrated as an optical sound transducer including a drum member 64 over which the film 38 travels, a window 66 through the surface of the drum, on opposite sides of which are an excitor lamp, shown schematically at 68 and a photoelectric pickup cell, shown schematically at 70.

The optical sound transducer 46 is located so that the track is 20 frames ahead of the picture, for 35 mm. film (26 frames ahead for 16 mm. film). This alignment is not as important when a separate soundtrack film 38 is utilized, but it is required when the soundtrack is located on the same film as the picture. Since magnetic soundtracks are traditionally 28 frames behind the picture on 35 mm. film, the present arrangement would not be suitable with such film unless a separate soundtrack such as 38, is utilized. On the other hand, the magnetic soundtrack on 16 mm. film is 26 frames ahead of the picture and 16 mm. projectors with the foregoing construction can be utilized for either optical or magnetic sound and with either incorporated or separate soundtracks.

The guide members 60 and 62 are biased by spring members 72 and 74, respectively, whereby any slack in the soundtrack film 38 is taken up and the soundtrack film 38 is positively disposed about the sound transducer drum 64. After leaving the sound transducer 46, the soundtrack film 38 is fed around the lower sound transducer sprocket wheel 48 as guided by an idler guide member 76 and a guide member 78 biased by a spring member 79, and from there travels downwardly, as indicated by the arrow 80, to the soundtrack takeup reel 50 (not shown in FIG. 2).

Referring now to FIG. 3 and to the dashed lines in FIG. 2, the soundtrack film 38, sound transducer sprocket wheels 32 and 48 and sound transducer guide members 60 and 62, are shown in schematic perspective view. The lowermost sprocket wheel 48 is formed with a central shaft 81 which is journaled through the central opening 82 of a pulley member 84, as indicated by the connecting line 86. The pulley member 84 is retained on the shaft 81 by means of a retaining screw 88 through a central flange portion 90, but may be otherwise retained thereon. The circumference of the pulley 84 is grooved, as indicated at 92, to accommodate the ridges or "teeth" 94 of the timing belt 96. The timing belt 96 is connected on its other loop end to a pulley 98 which is also grooved around its perimeter to accommodate and correspond with the "teeth" 94. The diameters of the pulleys 84 and 98 are determined by the reduction ratio required in accordance with the further relationships between the pulley 98 and upper sprocket wheel 32. In this particular illustration, the upper sprocket wheel 32 is not connected directly to the pulley 98, but is connected by its shaft 99 to a plurality of gears schematically indicated by the box shown by the dashed lines 100 and the gears 100 are connected by a shaft 101 to the pulley 98. The gears 100 effect a reduction in speed so that the diameter of the pulley 98 is chosen to be correspondingly smaller than the pulley 84 whereby the rotational speed of the upper sprocket wheel 32 exactly matches the rotational speed of the lower sprocket wheel 48. In this illustration, the sprocket wheels 32 and 48 are identical in size and configuration, and if the upper sprocket wheel 32 were to be directly connected to the pulley 98, the pulleys 98 and 84 would be chosen so as to have identical diameters. The utilization of the gearing mechanism 100 has other useful purposes, as hereinafter set forth.

Referring additionally to FIG. 4, the pulley 98 is rigidly connected to another timing belt pulley 102 and, for this purpose, the pulleys 98 and 102 may be formed coaxially as an integral one-piece structure. The pulleys 98 and 102 are journaled on the shaft 101 extending from the gearing 100 so as to effect rotation of the gearing and are secured thereon by a machine screw through a transversely directed hole 103 through the pulley 98. The pulley 102 is connected via a timing belt 106 to a timing belt driver pulley 108 which, in turn, is journaled on and secured to the rotation shaft 110 of a motor 112.

In operation, the motor 112 rotates the grooved pulley 108 which drives the pulley 102 which effects rotation of the pulley 98 which, in turn, drives the pulley 84 via the timing belt 96 and simultaneously drives the upper sprocket wheel 32 via the gearing 100. At the same time, the pulley 84 effects rotation of the lower sprocket wheel 48 so that the upper and lower sprocket wheels 32 and 48 are rotating simultaneously at the same exact speed.

By driving the upper sprocket wheel 32 via the gear 100, other components of the projector can be simultaneously operated by the motor 112. In accordance herewith, the gearing 100 is connected to the Geneva mechanism so that the motor 112 is also utilized to impart intermittent pull down movement to the film 16.

The soundtrack sprocket wheels 32 and 48 are dimensioned so as to rotate at 24 frames per second. In the particular construction utilized herein, the sprocket wheels 32 and 48 each have 24 teeth for engagement with the sprocket holes in the film 38. The grooved pulley 84 connected directly to the lower sprocket wheel 48 is provided circumferentially with 69 teeth having 1/5 inch pitch (where "pitch" refers to the distance apart of the grooves, in inches). The pulley 98 is provided circumferentially with 18 teeth of 1/5-inch pitch and is connected to the pulley 84 with a timing belt 24 inches around and three-eighths inch wide. The timing belt 96 also has its teeth set with 1/5-inch pitch (which here refers to the distance apart of the teeth, in inches). The pulley 102 has 16 teeth of 1/2-inch pitch and the motor pulley 108 has 12 teeth, also of 1/2-inch pitch, and is connected to the pulley 102 with a timing belt 21 inches in circumference, one-half inch wide and having a pitch of one-half inch. The timing belt 106 is of heavier construction than the timing belt 96 to allow it to better carry the rotating gearing 100. The motor 112 can be selected to rotate at a single predetermined speed appropriate to impart a rotational speed to the sprocket wheels 32 and 48 of 24 frames per second.

The utilization of timing belts 96 and 106 and pulleys 84, 98, 102 and 108 grooved therefor, is an important aspect of the invention as it is these components which allow the projector to operate at low noise levels and yet with a surprising longevity in components. The manner of interengagement of timing belts and pulleys is such that the projector can be operated for long periods of time without the build up of a differential in rotational speed of the sprocket wheels 32 and 48.

What is claimed is:

1. In a motion picture projector having a sound transducer between a pair of continuously rotatably sprocket wheels whereby a soundtrack is conducted between said sprocket wheels in operative association with said sound transducer, the combination with said sprocket wheels of:
   a motor;
   pulleys grooved for timing belt operation, comprising a first driven pulley mechanically connected to a first of said pair of sprocket wheels for rotation thereof, and a second driven pulley mechanically connected to a second of said pair of sprocket wheels for rotation thereof;
   a first timing belt connecting said motor to said first driven pulley;
   a driver pulley grooved for a timing belt and operatively connected to said first driven pulley to rotate therewith; and
   a second timing belt connecting said driver pulley to said second driven pulley;

whereby the rotational force of said motor is transmitted to said pulleys to thereby simultaneously rotate said sprocket wheels.

2. The invention according to claim 1 in which said driver pulley and first driven pulley are integrally formed in one piece.

3. The invention according to claim 1 in which at least one of said sprocket wheels is rigidly affixed to its respective driven pulley to rotate directly therewith as an integral unit.

4. The invention according to claim 1 in which said sprocket wheels are vertically aligned on opposite sides of said sound transducer.

5. The invention according to claim 1 in which said sprocket wheels are identically sized, said grooved pulleys being sized to impart identical rotational speeds to said sprocket wheels.

6. In a motion picture projector having a sound transducer between a pair of continuously rotatable sprocket wheels whereby a soundtrack is conducted between said sprocket wheels in operative association with said sound transducer, the combination with said sprocket wheels of:

a motor:

pulleys grooved for timing belt operation, comprising a first driven pulley mechanically connected to a first of said pair of sprocket wheels for rotation thereof, and a second driven pulley mechanically connected to a second of said pair of sprocket wheels for rotation thereof;

at least one of said sprocket wheels being connected via gearing to its respective driven pulley; and timing belt means interconnecting said pulleys and said motor whereby the rotational force of said motor is transmitted to said pulleys to thereby simultaneously rotate said sprocket wheels.

7. The invention according to claim 6 in which said gearing is further connected to impart intermittent pull down movement to said film.

* * * * *